United States Patent

Shimizu

[11] 4,316,653
[45] Feb. 23, 1982

[54] CONDENSER OPTICAL SYSTEM FOR A MICROSCOPE

[75] Inventor: Yoshiyuki Shimizu, Miura, Japan

[73] Assignee: Nippon Kogaku K.K., Tokyo, Japan

[21] Appl. No.: 19,600

[22] Filed: Mar. 12, 1979

[30] Foreign Application Priority Data

Mar. 20, 1978 [JP] Japan .................................. 53-31132

[51] Int. Cl.³ .......................... G02B 9/34; G02B 9/60; G02B 21/08
[52] U.S. Cl. ...................................... 350/465; 350/12; 350/87; 350/469
[58] Field of Search ............... 350/216, 220, 236, 237, 350/175 ML, 87, 12, 13, 410, 414, 465, 469

[56] References Cited

U.S. PATENT DOCUMENTS

| | | | |
|---|---|---|---|
| 3,592,530 | 7/1971 | Klein | 350/216 |
| 4,037,934 | 7/1977 | Matsubara | 350/175 ML |
| 4,059,342 | 11/1977 | Tojyo | 350/175 ML |
| 4,060,306 | 11/1977 | Swaminathan | 350/87 |
| 4,084,885 | 4/1978 | Coussot | 350/175 ML |

*Primary Examiner*—John K. Corbin
*Assistant Examiner*—Scott J. Sugarman
*Attorney, Agent, or Firm*—Shapiro and Shapiro

[57] ABSTRACT

A condenser optical system for a microscope comprises, in order from the light ray entrance side, a forward group and a rearward group. The forward group includes a negative lens component and a positive lens component either cemented to or separated from the negative lens component. The rearward group consists of a plurality of lens components and has a totally positive refractive power. The air separation between the forward group and the rearward group is smaller than the total center thickness of the rearward group. The front focus of the rearward group lies in the air separation.

The condenser optical system is of high magnification and yet can perform good optical compensation for the light source.

10 Claims, 5 Drawing Figures

CONDENSER OPTICAL SYSTEM FOR A MICROSCOPE

BACKGROUND OF THE INVENTION

1. Field of the Invention

This invention relates to an illuminating optical system for a microscope, and more particularly to a condenser optical system in a microscope for illuminating a sample surface.

2. Description of the Prior Art

Generally, an illuminating optical system for a microscope is indispensable for various microscopic examinations using a phase microscope, an interference microscope or the like. Above all, the condenser lens not only performs the function of concentrating the illuminating light upon a sample surface but also bears an important role of compensation for various physico-optical actions. For effective illumination where the objective lens is of high magnification, an optical system in which the magnification of the condenser lens itself is high, namely, the focal length is short, is advantageous.

However, from the view point of the light source compensation, particularly in the polarization type differential interference microscope, the shorter the focal length of the condenser lens, the more difficult providing compensation for the light source becomes. That is, for the compensation for the light source of the polarization type differential interference microscope, a member identical to a so-called Wollaston prism disposed rearwardly of the objective lens is located at the position of the pupil of the condenser lens. However, this Wollaston prism is for splitting polarized light and structurally it is not essentially coaxially symmetrical with respect to the optic axis. Accordingly, the manner in which the prism acts upon the received light differs depending on the direction of the incident light. Moreover, the shorter the focal length of the condenser lens, the greater the angle of incidence of the light ray upon a Wollaston prism placed at the front focus position of the condenser lens. Therefore, the anisotropy of the action of the prism on the light becomes more significant so that the light source compensation becomes incomplete.

Thus, the use of the conventional condenser lens capable of effecting illumination of high magnification with a polarization type differential interference microscope results in incomplete compensation for the light source, and this has made it impossible to observe the more minute structure of a sample in a uniform view field.

SUMMARY OF THE INVENTION

It is an object of the present invention to provide a condenser optical system which is of high magnification and yet can perform good optical compensation for the light source.

To achieve such an object, the condenser optical system of the present invention comprises, in order from the light ray entrance side, a forward group including a negative lens component and a positive lens component cemented to or separated from said negative lens component, and a rearward group including a plurality of lens components and having a totally positive refractive power, the air separation between said forward group and said rearward group being smaller than the total center thickness of said rearward group, and the front focus of said rearward group lying in said air separation.

The invention will become more fully apparent from the following detailed description thereof taken in conjunction with the accompanying drawings.

DESCRIPTION OF THE PREFERRED EMBODIMENTS

Figure 1:
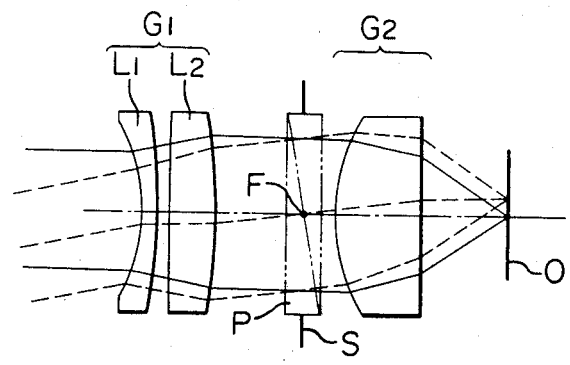
FIG. 1 is a schematic cross-sectional view of the condenser optical system of the present invention.

The condenser optical system according to the present invention is shown in the schematic cross-sectional view of FIG. 1. The condenser optical system includes, as viewed from the light ray entrance side, a forward lens group G1 consisting of a negative lens L1 and a positive lens L2, and a rearward lens group G2 having a positive refractive power, and constructed such that the front focus F of the rearward group lies in the air separation between the two groups. Where the condenser optical system is used on a polarization type differential interference microscope, a Wollaston prism P is disposed at the position of an aperture stop S (the front focus position of the rearward group). In FIG. 1, the illuminating light rays reaching the center of the view field of a sample surface O are indicated by solid lines and the light rays reaching the marginal region of the view field are indicated by dotted lines.

The air separation between the forward group G1 and the rearward group G2 will suffice if it is enough to permit a Wollaston prism to be inserted therein. However, the air separation should desirably be smaller than the center thickness of the rearward group from the points of view of aberrations and the mechanical limitation on the lens barrel of the condenser lens. Also, the negative lens L1 and the positive lens L2 of the forward group G1 may be separated from each other or may be joined together, and the negative lens L1 has its concave surface of sharper curvature facing the light ray entrance side and the positive lens L2, has its surface of sharper curvature facing the light ray exit side. The focal length of the forward group G1 is greater than ten times the total focal length of the entire system and the forward group may be regarded as a substantially afocal system having the function of maintaining the focal length of the entire system smaller than that of the rearward group G2. The magnification, namely, the ratio of the total focal length of the entire system to the focal length of the rearward group should desirably be in the range of 0.6 to 0.95.

Where the focal length of the combined system of the forward group G1 and the rearward group G2 is made constant, the smaller the magnification of the forward group, the longer the focal length of the rearward group and the smaller the angle of oblique rays passing through the front focal plane of the rearward group. Therefore, the magnification of the forward group should desirably be smaller from the view point of the light source compensation. However, generally, this is not desirable because the various aberrations are increased in proportion to the focal length. Moreover, the smaller the magnification of the forward group, the larger the width of the light beam leaving the forward group. Thus, it becomes necessary to increase the effective diameter of the rearward group and the size of the Wollaston prism itself disposed at the front focus position of the rearward group. With these taken into account, it is desirable to determine the magnification of the forward group in the aforementioned range.

The construction of the present invention will hereinafter be described in detail with respect to FIG. 2 which shows a first embodiment.

The forward group G1 is of the previously described construction. The dispersion of the negative lens component L1 is greater than that of the positive lens component L2 and the forward group peculiary has an achromatizing action, and can therefore mitigate the achromatizing duty of the rearward group G2 to some extent.

The rearward group G2 comprises, in order from the light ray entrance side, a biconvex first positive lens component L3, a first negative lens component L4 cemented to the lens component L3 (the lens components L3 and L4 being combined to have a positive refractive power), a meniscus-shaped second positive lens component L5 having its convex surface facing the light ray entrance side, a third positive lens component L6 having its surface of sharper curvature (desirably, a surface substantially aplanatic to the incident light) facing the light ray entrance side, and a second negative lens component L7 cemented to the third positive lens component L6.

In the above-described construction, the rearward group is substantially known, but dense flint material having a greater dispersion and refractive power than the third positive lens component L6 has been used as the lens material corresponding to the second negative lens component L7 to correct spherical aberration and chromatic aberration. Therefore, the spherical aberration for short wavelength light rays becomes overcorrected. Where microscopic photometry is effected or where the illuminated field stop must be extremely stopped down as in the condenser for a high magnification objective lens, this causes a very inconvenient situation because short wavelength light rays come around to the outside of the stopped illuminated field.

A condenser lens has a very large numerical aperture (N.A.) due to its characteristic. Therefore, the lens corresponding to the third positive lens component L6 substantially satisfies aplanatic conditions with respect to the incident light and thereby normally obtains a large numerical aperture. Since the magnification peculiar to the third positive lens component L6 is very small, the aberrations created by the third positive lens component L6 have a decisive effect on the correction of the aberrations of the entire system. Further, as already noted, the use of the dense flint material for the lens corresponding to the second negative lens component L7 results in overcorrection of the spherical aberration for short wavelength light rays. This is not advisable in terms of aberrations and its influence has been so great that it cannot be negated in the other portions of the lens system. It is therefore desirable that the values of the Abbe numbers $\nu d_6$ and $\nu d_7$ of the lens components L6 and L7 be as great as possible and in the present invention, it is desirable that the following two conditions be satisfied:

$$\nu d_6 > 50 \ldots \quad (1)$$

$$0 < \nu d_6 - \nu d_7 < 15 \ldots \quad (2)$$

Condition (1) above is intended to reduce the occurrence of chromatic aberration in the forward surface $R_{10}$ of the third positive lens component L6 and if this range is exceeded, not only does the longitudinal chromatic aberration become under-corrected, but also chromatic spherical aberration is greatly disturbed so that even when the correction is made by the second negative lens component L7, the spherical aberration for short wavelength light rays becomes overcorrected. Condition (2) above is intended to prevent overcorrection of the spherical aberration for short wavelength light rays, in relation to condition (1) above, and to reduce the difference in dispersive power between the Abbe numbers $\nu d_6$ and $\nu d_7$ in the cemented surfaces of the lens components L6 and L7, which has a significant role in the correction of spherical aberration, and thereby prevent disturbance of spherical aberration for each wavelength. If the upper limit of condition (2) is exceeded, disturbance of chromatic spherical aberration is caused and if the lower limit of condition (2) is departed from, longitudinal chromatic aberration is created to increase the achromatizing duty of the other lenses, which is not advisable. Therefore, the longitudinal chromatic aberration unavoidably becomes under-corrected but this may be compensated for by making the forward group have an achromatizing action as already described.

Numerical data of the first and second embodiments of the present invention will we shown below. In the first embodiment, the negative lens component L1 and the positive lens component L2 forming the forward group G1 are separated. In the second embodiment, these two components are cemented together (the lens interval $d_2$ is missing). In the tables below, $R_i$ represents the radius of curvature of each lens surface, $d_i$ the distance between adjacent lens surfaces, $n_i$ and $\nu d_i$ represent the refractive index and Abbe number, respectively, of each lens, and the subscript i represents the order from the light ray entrance side. In the tables below, the numerical data of the oil for oil immersion and the slide glass are also shown. The unit of length is millimeters.

First Embodiment:

Focal length $f = 8.00$     N.A. $= 1.35$
Focal length of the forward group $f_1 = 721.068$
Focal length of the rearward group $f_2 = 10.046$ $$\frac{f}{f_2} = 0.08$$

$G_1 \begin{cases} R_1 = -15.900 \\ R_2 = -38.179 \\ R_3 = \infty \\ R_4 = -28.000 \end{cases}$ $R_5 = 29.041$ $R_6 = -24.500$ $R_7 = 500.000$ $d_1 = 2.0$     $n_1 = 1.75520$     $\nu d_1 = 27.50$ $d_2 = 3.6$ $d_3 = 7.0$     $n_2 = 1.62041$     $\nu d_2 = 60.30$ $d_4 = 11.0$ $d_5 = 9.5$     $n_3 = 1.58913$     $\nu d_3 = 61.20$ $d_6 = 0.8$     $n_4 = 1.75520$     $\nu d_4 = 27.50$ $d_7 = 0.2$ -continued

| Focal length f = 8.00 | N.A. = 1.35 |
|---|---|
| Focal length of the forward group $f_1$ = 721.068 | |
| Focal length of the rearward group $f_2$ = 10.046 | |
| $\dfrac{f}{f_2}$ = 0.08 | |

$G_2$
| | | | |
|---|---|---|---|
| $R_8$ = 16.600 | $d_8$ = 5.4 | $n_5$ = 1.62041 | $\nu d_5$ = 60.30 |
| $R_9$ = 68.585 | $d_9$ = 0.1 | | |
| $R_{10}$ = 7.304 | $d_{10}$ = 8.8 | $n_6$ = 1.62280 | $\nu d_6$ = 56.90 |
| $R_{11}$ = −57.500 | $d_{11}$ = 1.0 | $n_7$ = 1.74443 | $\nu d_7$ = 49.4 |
| $R_{12}$ = ∞ | $d_{12}$ = 0.593 | $n_8$ = 1.51690 | $\nu d_8$ = 30.98 (oil) |
| | $d_{13}$ = 1.0 | $n_9$ = 1.52726 | $\nu d_9$ = 55.04 (slide glass) |

The front focus position of the rearward group G2 is 1.037 ahead of the vertex of the forwardmost lens surface $R_5$ of the rearward group.

Second Embodiment:

| Focal length f = 8.00 | N.A. = 1.35 |
|---|---|
| Focal length of the forward group $f_1$ = 236.5 | |
| Focal length of the rearward group $f_2$ = 8.850 | |
| $\dfrac{f}{f_2}$ = 0.90 | |

$G_1$
| | | | |
|---|---|---|---|
| $R_1$ = −32.241 | $d_1$ = 4.5 | $n_1$ = 1.67270 | $\nu d_1$ = 32.2 |
| $R_2'$ = ∞ | $d_2$ = 7.5 | $n_2$ = 1.62041 | $\nu d_2$ = 60.3 |
| $R_4$ = −28.000 | $d_4$ = 11.065 | | |

$G_2$
| | | | |
|---|---|---|---|
| $R_5$ = +25.555 | $d_5$ = 8.0 | $n_3$ = 1.51680 | $\nu d_3$ = 64.2 |
| $R_6$ = −19.800 | $d_6$ = 1.0 | $n_4$ = 1.75520 | $\nu d_4$ = 27.5 |
| $R_7$ = −400.000 | $d_7$ = 0.2 | | |
| $R_8$ = +14.369 | $d_8$ = 4.0 | $n_5$ = 1.62041 | $\nu d_5$ = 60.3 |
| $R_9$ = +58.000 | $d_9$ = 0.1 | | |
| $R_{10}$ = +6.450 | $d_{10}$ = 8.0 | $n_6$ = 1.61272 | $\nu d_6$ = 58.6 |
| $R_{11}$ = −66.990 | $d_{11}$ = 0.75 | $n_7$ = 1.74400 | $\nu d_7$ = 44.9 |
| $R_{12}$ = ∞ | $d_{12}$ = 0.5 | $n_8$ = 1.51690 | $\nu d_8$ = 43.51 (oil) |
| | $d_{13}$ = 1.0 | $n_9$ = 1.52726 | $\nu d_9$ = 55.04 (slide glass) |

The front focus position of the rearward group G2 is 1.065 ahead of the vertex of the forwardmost lens surface of the rearward group.

Figure 2:
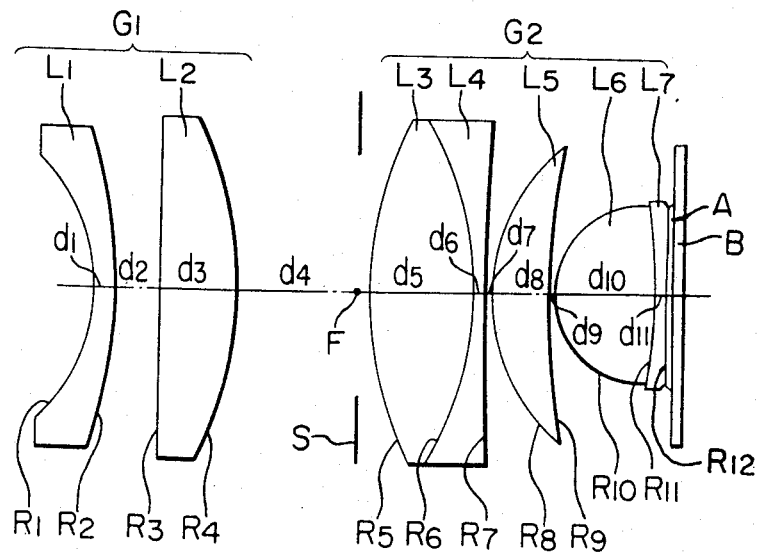
FIG. 2 shows the lens arrangement in a first embodiment of the present invention.
Figure 3:
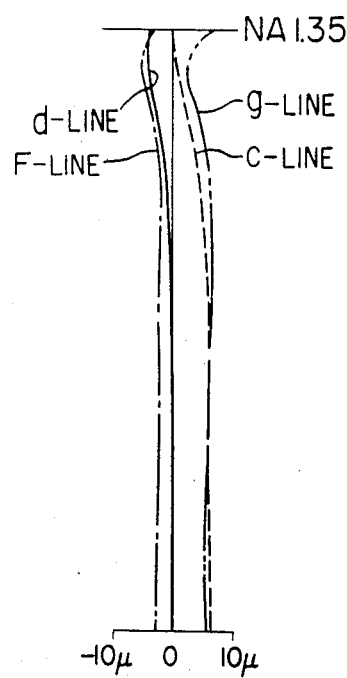
FIG. 3 illustrates the spherical aberration and chromatic aberration in the first embodiment.
Figure 5:
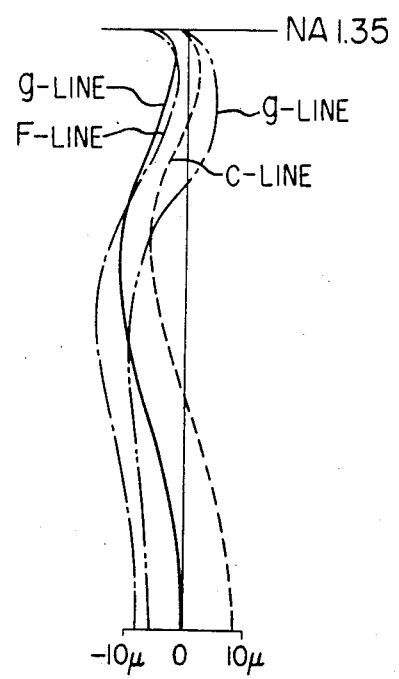
FIG. 5 illustrates the spherical aberration and chromatic aberration in the second embodiment.
Figure 4:
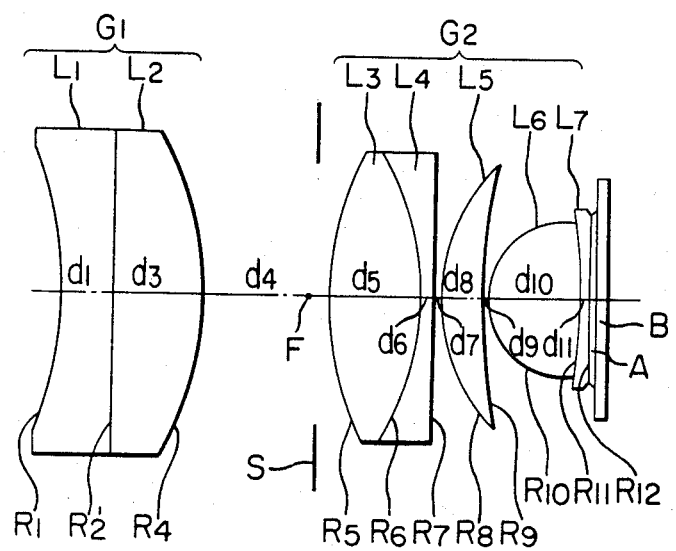
FIG. 4 shows the lens arrangement in a second embodiment of the present invention.

The lens arrangements of the first and second embodiments are shown in FIGS. 2 and 4, respectively. In these Figures, the oil A for oil immersion and preparation B are also shown at the back of the rearward group. The spherical aberrations and chromatic aberrations in the first and second embodiments are shown in FIGS. 3 and 5, respectively. These showings refer to the state which includes the oil and slide glass shown in the tables of numerical data, and it is seen therefrom that the aberrations are corrected very well.

In the present invention, as has hitherto been described, the design is such that the total focal length of the condenser lens system is shortened by the combined system of the forward and rearward groups to thereby enable illumination with high magnification and relatively reduce the angle which the illuminating light reaching the marginal region of the view field forms with the optic axis between the forward group and the rearward group, thereby enabling the light source to be well compensated for by a Wollaston prism. Where the focal length of the condenser lens is short, the lens arrangement has heretofore been too complex to correct the aberrations well, and the front focus of the condenser lens has come to lie within the interior of the lens, making it difficult to provide the aperture stop in optimum conditions. However, according to the construction of the present invention, the focal length of the rearward group can be made relatively long even if the total focal length of the condenser optical system is considerably short, and this is advantageous for optimum positioning of the aperture stop. It will therefore be appreciated that the condenser optical system of the present invention is not restricted to its use with the polarization type differential interference microscope, but is excellently suited for the usual microscopic examination.

I claim:

1. A condenser optical system having high magnification and good optical compensation properties for a microscope comprising, in order from the light ray entrance side:

a forward group including a negative lens component and a positive lens component, said negative lens component being a negative meniscus lens component having its surface of sharper curvature facing the light ray entrance side, and said positive lens component having its surface of sharper curvature facing the light ray exit side; and a rearward group having a totally positive refractive power, the rearward group including, in order from the light ray entrance side, a biconvex first positive lens component, a first negative lens component cemented to said biconvex first positive lens component, a meniscus-shaped positive lens component having its convex surface facing the light ray entrance side, a biconvex third positive lens component having its surface of sharper curvature facing the light ray entrance side, and a second negative lens component cemented to said third positive lens component and having a plane surface facing the light ray exit side, the air separation between said forward group and said rearward group being smaller than the total center thickness of said rearward group, and the front focus of said rearward group lying in said air separation.

2. A condenser optical system according to claim 1, wherein, in said forward group, the dispersion of said negative meniscus lens component is greater than that of said positive lens component.

3. A condenser optical system according to claim 1, wherein the total focal length of said system is greater than 0.6 times the focal length of said rearward group and smaller than 0.95 times the focal length of said rearward group.

4. A condenser optical system according to claim 1, further comprising a Wollaston prism removably inserted between said forward group and said rearward group.

5. A condenser optical system according to claim 1, wherein said third positive lens component and said second negative lens component satisfy the conditions $$\nu d_6 > 50$$

$$0 < \nu d_6 - \nu d_7 < 15$$

where $\nu d_6$ and $\nu d_7$ are the Abbe numbers of said two lens components.

6. A condenser optical system according to claim 1, wherein the numerical data are as follows:

Focal length f = 8.00   N.A. = 1.35
Focal length of the forward group $f_1$ = 721.068
Focal length of the rearward group $f_2$ = 10.046

$$\frac{f}{f_2} = 0.08$$

$$G_1 \begin{cases} R_1 = -15.900 \\ R_2 = -38.179 \\ R_3 = \infty \\ R_4 = -28.000 \end{cases}$$

$d_1 = 2.0$   $n_1 = 1.75520$   $\nu d_1 = 27.50$
$d_2 = 3.6$
$d_3 = 7.0$   $n_2 = 1.62041$   $\nu d_2 = 60.30$
$d_4 = 11.0$ $$G_2 \begin{cases} R_5 = 29.041 \\ R_6 = -24.500 \\ R_7 = 500.000 \\ R_8 = 16.600 \\ R_9 = 68.585 \\ R_{10} = 7.304 \\ R_{11} = -57.500 \\ R_{12} = \infty \end{cases}$$

$d_5 = 9.5$   $n_3 = 1.58913$   $\nu d_3 = 61.20$
$d_6 = 0.8$   $n_4 = 1.75520$   $\nu d_4 = 27.50$
$d_7 = 0.2$
$d_8 = 5.4$   $n_5 = 1.62041$   $\nu d_5 = 60.30$
$d_9 = 0.1$
$d_{10} = 8.8$   $n_6 = 1.62280$   $\nu d_6 = 56.90$
$d_{11} = 1.0$   $n_7 = 1.74443$   $\nu d_7 = 49.4$ and wherein the front focus position of the rearward group G2 is 1.037 ahead of the vertex of the forward-most lens surface $R_5$ of the rearward group.

7. A condenser optical system according to claim 1, wherein the numerical data are as follows:

Focal length f = 8.00   N.A. = 1.35
Focal length of the forward group $f_1$ = 236.5
Focal length of the rearward group $f_2$ = 8.850

$$\frac{f}{f_2} = 0.90$$

$$G_1 \begin{cases} R_1 = -32.241 \\ R_2' = \infty \\ R_4 = -28.000 \end{cases}$$

$d_1 = 4.5$   $n_1 = 1.67270$   $\nu d_1 = 32.2$
$d_2 = 7.5$   $n_2 = 1.62041$   $\nu d_2 = 60.3$
$d_4 = 11.065$ $$G_2 \begin{cases} R_5 = +25.555 \\ R_6 = -19.800 \\ R_7 = -400.000 \\ R_8 = +14.369 \\ R_9 = +58.000 \\ R_{10} = +6.450 \\ R_{11} = -66.990 \\ R_{12} = \infty \end{cases}$$

$d_5 = 8.0$   $n_3 = 1.51680$   $\nu d_3 = 64.2$
$d_6 = 1.0$   $n_4 = 1.75520$   $\nu d_4 = 27.5$
$d_7 = 0.2$
$d_8 = 4.0$   $n_5 = 1.62041$   $\nu d_5 = 60.3$
$d_9 = 0.1$
$d_{10} = 8.0$   $n_6 = 1.61272$   $\nu d_6 = 58.6$
$d_{11} = 0.75$   $n_7 = 1.74400$   $\nu d_7 = 44.9$ and wherein the front focus position of the rearward group G2 is 1.065 ahead of the vertex of the forward-most lens surface $R_5$ of the rearward group.

8. A condenser optical system according to claim 1, wherein, in said forward group, said positive lens component is cemented to said negative lens component.

9. A condenser optical system according to claim 1, wherein the focal length of the forward group is greater than ten times the focal length of said system, the forward group being a substantially afocal lens group for maintaining the focal length of said system smaller than the focal length of said rearward group.

10. A condenser optical system according to claim 1, further comprising a slide glass disposed at the light ray exit side of said second negative lens component of said rearward group, the separation defined between said second negative lens component and said slide glass being filled with oil.

* * * * *